/

US008340030B2

(12) United States Patent
Pelletier et al.

(10) Patent No.: US 8,340,030 B2
(45) Date of Patent: Dec. 25, 2012

(54) METHOD AND APPARATUS FOR HIGH-SPEED TRANSMISSION ON RACH

(75) Inventors: Benoit Pelletier, Roxboro (CA); Eldad M. Zeira, Huntington, NY (US); Paul Marinier, Brossard (CA); Christopher R. Cave, Verdun (CA); Rocco DiGirolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 996 days.

(21) Appl. No.: 12/237,821

(22) Filed: Sep. 25, 2008

(65) Prior Publication Data

US 2009/0185540 A1 Jul. 23, 2009

Related U.S. Application Data

(60) Provisional application No. 60/975,851, filed on Sep. 28, 2007.

(51) Int. Cl.
*H04W 4/00* (2009.01)
*H04L 12/26* (2006.01)
*H04W 72/00* (2009.01)

(52) U.S. Cl. .......................... 370/329; 370/230; 455/450

(58) Field of Classification Search .......................... None
See application file for complete search history.

(56) References Cited

U.S. PATENT DOCUMENTS

| 2005/0026616 | A1* | 2/2005 | Cavalli et al. | 455/436 |
|---|---|---|---|---|
| 2005/0105640 | A1 | 5/2005 | Han et al. | |
| 2005/0207359 | A1* | 9/2005 | Hwang et al. | 370/278 |
| 2006/0146762 | A1 | 7/2006 | Kuroda et al. | |
| 2007/0038629 | A1* | 2/2007 | Vinh et al. | 707/9 |
| 2007/0047451 | A1* | 3/2007 | Lohr et al. | 370/242 |
| 2007/0047452 | A1* | 3/2007 | Lohr et al. | 370/242 |
| 2007/0047500 | A1* | 3/2007 | Usuda et al. | 370/335 |
| 2007/0147326 | A1 | 6/2007 | Chen | |
| 2007/0211660 | A1* | 9/2007 | Teague | 370/329 |
| 2007/0225015 | A1* | 9/2007 | Mueckenheim et al. | 455/453 |
| 2007/0297360 | A1* | 12/2007 | Joachim et al. | 370/329 |
| 2008/0008152 | A1* | 1/2008 | Lohr et al. | 370/342 |
| 2008/0049669 | A1* | 2/2008 | Lundby et al. | 370/329 |
| 2008/0056182 | A1 | 3/2008 | Usuda et al. | |
| 2008/0151819 | A1* | 6/2008 | Bachl et al. | 370/329 |
| 2008/0186862 | A1* | 8/2008 | Corbett et al. | 370/237 |

(Continued)

FOREIGN PATENT DOCUMENTS

EP 1 615 385 1/2006

(Continued)

OTHER PUBLICATIONS

"Enhanced Uplink for CELL_FACH State in FDD," 3GPP TSG-RAN Meeting #37, RP-070677, (Riga, Latvia, Sep. 11-14, 2007).

(Continued)

*Primary Examiner* — Clemence Han
(74) *Attorney, Agent, or Firm* — Condo Roccia LLP (57) ABSTRACT

A method and apparatus for signaling in a wireless transmit receive unit (WTRU). The method includes the WTRU receiving a value of a maximum number of retransmissions and retransmitting data in a plurality of hybrid automatic retransmission request (HARQ) processes limited by the value of a maximum number of retransmission. The WTRU is configured to receive a cell-specific, fixed or absolute grant on a broadcast channel.

12 Claims, 8 Drawing Sheets

U.S. PATENT DOCUMENTS

| | | | |
|---|---|---|---|
| 2008/0254804 A1* | 10/2008 | Lohr et al. | 455/442 |
| 2009/0046667 A1* | 2/2009 | Pelletier et al. | 370/335 |
| 2010/0197315 A1* | 8/2010 | Lindstrom et al. | 455/450 |
| 2011/0038323 A1* | 2/2011 | Liang et al. | 370/329 |

FOREIGN PATENT DOCUMENTS

| | | |
|---|---|---|
| EP | 1 630 981 | 3/2006 |
| EP | 1 708 523 | 10/2006 |
| JP | 2005-151573 A | 6/2005 |
| JP | 2006-191312 A | 7/2006 |
| JP | 2007-082192 A | 3/2007 |
| WO | 2006/031177 | 3/2006 |
| WO | WO 2006/051827 A1 | 5/2006 |

OTHER PUBLICATIONS

"Introduction of Enhanced Uplink in CELL_FACH in 25.331," 3GPP TSG-RAN WG2 Meeting #63, R2-084923, (Jeju, Korea, Aug. 18-22, 2008).

NSN, Nokia, "Further discussion on enhanced CELL_FACH in REL8," 3GPP TSG-RAN WG2 Meeting #59, R2-073254, (Athens, Greece, Aug. 20-24, 2007).

Siemens, "Text Proposal for L3 based serving cell change," 3GPP TSG-RAN WG2 Meeting #46bis, R2-050788, Beijing, China (Apr. 4-8, 2005).

Third Generation Partnership Project, "Technical Specification Group Radio Access network; Radio Resource Control (RRC); Protocol Specification (Release 7)," 3GPP TS 25.331 V7.5.0 (Jul. 2007).

Third Generation Partnership Project, "Technical Specification Group Radio Access network; Radio Resource Control (RRC); Protocol Specification (Release 7)," 3GPP TS 25.331 V7.10.0 (Sep. 2008).

Third Generation Partnership Project, "Technical Specification Group Radio Access network; Radio Resource Control (RRC); Protocol Specification (Release 8)" 3GPP TS 25.331 V8.4.0 (Sep. 2008).

Third Generation Partnership Project, "Technical Specification Group Radio Access Network; Physical channels and mapping of transport channels onto physical channels (FDD) (Release 7)," 3GPP TS 25.211 V7.2.0 (Jun. 2007).

Third Generation Partnership Project, "Technical Specification Group Radio Access Network; Physical channels and mapping of transport channels onto physical channels (FDD) (Release 7)," 3GPP TS 25.211 V7.3.0 (Sep. 2007).

Third Generation Partnership Project, "Technical Specification Group Radio Access Network; Physical channels and mapping of transport channels onto physical channels (FDD) (Release 7)," 3GPP TS 25.211 V7.6.0 (Jun. 2008).

Third Generation Partnership Project, "Technical Specification Group Radio Access Network; Physical channels and mapping of transport channels onto physical channels (FDD) (Release 8)," 3GPP TS 25.211 V8.2.0 (Sep. 2008).

Third Generation Partnership Project, "Technical Specification Group Radio Access Network; Physical channels and mapping of transport channels onto physical channels (FDD) (Release 7)," 3GPP TS 25.211 W.2.0 (Jun. 2007).

International Patent Application No. PCT/US2008/077655: Notification of Transmittal of International Preliminary Report on Patentability dated Dec. 18, 2009, 13 pages.

International Patent Application No. PCT/US2008/077655: International Search Report dated May 15, 2009, 6 pages.

International Patent Application No. PCT/US2008/077655: Written Opinion dated May 15, 2009, 7 pages.

3rd Generation Partnership Project (3GPP), R2-073834, "Defining of reordering SDU and correction to the definition of the SI field", Samsung, Qualcomm, 3GPP TSG-RAN WG2#59, Athens, Greece, Aug. 20-24, 2007, 11 pages.

* cited by examiner

METHOD AND APPARATUS FOR HIGH-SPEED TRANSMISSION ON RACH

CROSS REFERENCE TO RELATED APPLICATIONS

This application claims the benefit of U.S. provisional application No. 60/975,851 filed on Sep. 28, 2007, which is incorporated by reference as if fully set forth.

FIELD OF INVENTION

This application is related to wireless communications.

BACKGROUND

In many cellular communications systems, the access to radio resources is controlled by the radio network. When a wireless transmit/receive unit (WTRU) has data to transmit to the network, it acquires radio resource access before transmitting its data payload. To achieve this in a 3rd Generation Partnership Project (3GPP) network, for example, a WTRU must gain access to the random access channel (RACH). Access to the RACH is contentious and there are mechanisms to reduce the probability of collision, that is, when two WTRUs are accessing the resource simultaneously.

Procedures for random access include a preamble phase with power ramp-up followed by channel acquisition information and message transmission. Because of the contentious nature of the RACH, to avoid WTRUs holding the shared radio resource for a long time, and because there is no power control, relatively short message payloads are transmitted on the RACH, leading to a relatively small data rate. Therefore, the RACH is generally used for the transmission of short control messages. Typically, WTRUs demanding larger data rates would be configured by the network to use dedicated resources.

While the data rate provided by the RACH is sufficient for the transmission of short control messages typical of networks supporting mostly speech communications, it is inefficient for the transmission of data messages associated with non-real-time data services, such as internet browsing, e-mail, and the like. For these data services, the traffic is bursty by nature and long periods of inactivity may exist between successive transmissions. For some applications requiring frequent transmission of keep-alive messages, for example, this may result in an inefficient utilization of dedicated resources. Therefore, it may be advantageous for the network to use shared resources for data transmission instead. The difficulty however, resides in the low data rate offered by the existing RACH.

Figure 1:
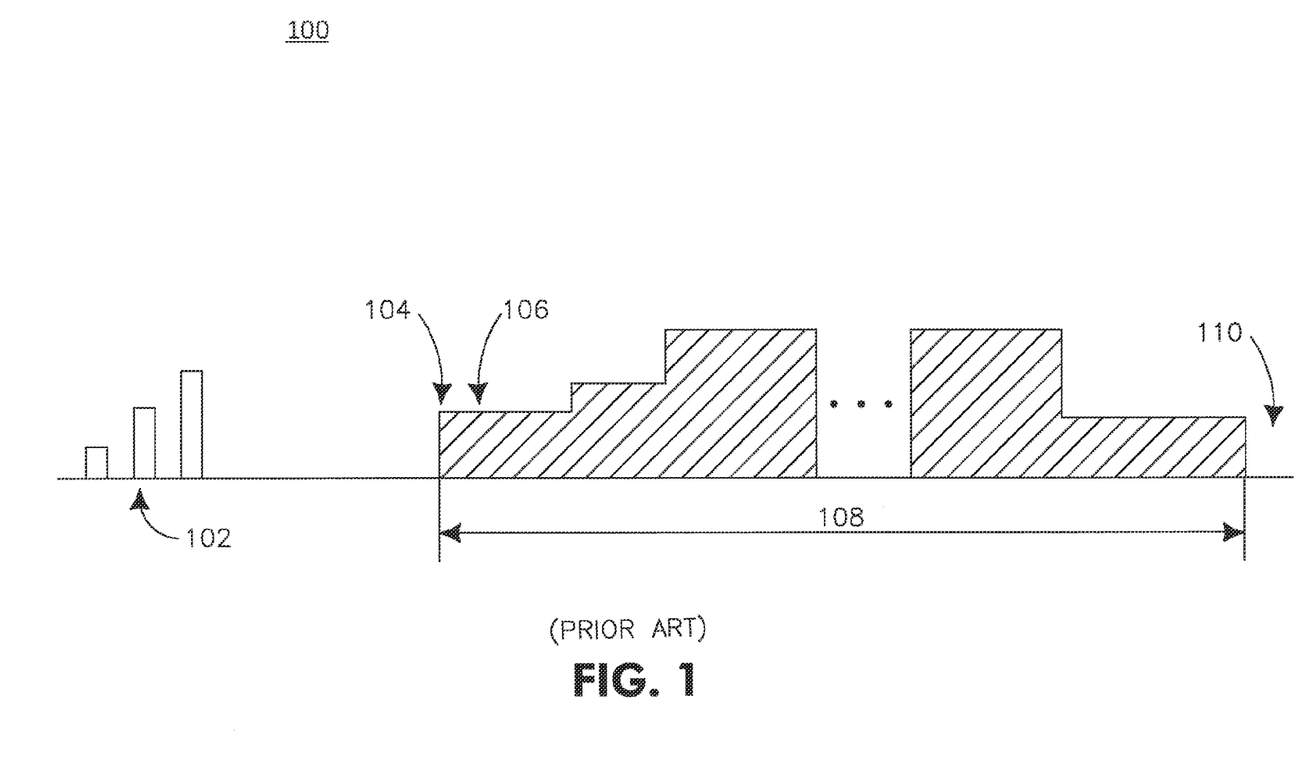
FIG. 1 shows RACH access with E-DCH in accordance with the prior art.

FIG. 1 shows RACH access with a shared enhanced dedicated channel (E-DCH) 100 in accordance with the prior art. A RACH access with E-DCH 100, hereafter "E-RACH", may include a RACH preamble phase 102, initial resource assignment 104, collision detection and resolution 106, an E-RACH message part 108, and release of resources 110 or transition to other state.

A WTRU may operate in multiple states. The form of the E-DCH while a WTRU is in CELL_DCH state may not be optimal for use in CELL_FACH state. In the context of CELL_FACH, the E-DCH suffers from three main drawbacks. First, the hybrid automatic repeat request (HARQ) processes with acknowledge/negative acknowledge (ACK/NACK) signaling in a shared environment are inefficient, particularly when only one medium access control (MAC) protocol data unit (PDU) needs to be transmitted. A MAC PDU may include a MAC-e PDU, a MAC-i PDU, or any other type of MAC-level PDU that is passed on to the physical layer. Second, there are too many downlink (DL) control channels Furthermore, the enhanced-dedicated physical control channel (E-DPCCH) overhead is too high.

During the E-RACH message part, the retransmissions occur at a fixed interval in time. For example, the retransmissions are separated by 3 TTIs for a system using 10 ms transmission time intervals (TTIs) and 7 TTIs in a system using 2 ms TTIs. If not all HARQ processes are used then the E-RACH is under-loaded and inefficient. In addition, the power control loop must be maintained even in periods of non-transmission.

The HARQ retransmissions can be inefficient in the context of a shared radio link where not all of the HARQ processes are occupied. For example, a WTRU may gain access to a shared E-RACH to transmit a single MAC-e PDU. If the MAC-e PDU is small enough, it will be transmitted in a single HARQ process, such as HARQ process 1, for example. In the context of E-DCH, if a Node B replies with a NACK on the corresponding HARQ indicator channel (E-HICH), then a retransmission occurs in the next HARQ process 1. This may occur after 14 ms in a system using a 2 ms TTI and after 30 ms in a system using a 10 ms TTI. Thus every time a single MAC-e PDU is transmitted, 7/8 of the HARQ processes are unused in the case of the 2 ms TTI and 3/4 of the HARQ processes are unused in the case of a 10 ms TTI. Unless the WTRU has a relatively large amount of data to transfer, it can be concluded that using the shared resources in such a way is wasteful. Therefore, it would be desirable to have a set of mechanisms for efficient use of the E-DCH on the uplink RACH.

SUMMARY

A method and apparatus for signaling in a wireless transmit receive unit is disclosed. The method may include a WTRU receiving a value of a maximum number of retransmissions and retransmitting data in a plurality of HARQ processes. The HARQ processes may be limited by the value of the maximum number of retransmissions.

Multiple PDUs transmitted from a single WTRU may be time-multiplexed. Furthermore, transmissions from multiple WTRUs may be time-multiplexed.

The WTRU may receive a cell-specific grant on a broadcast channel. The grant may be fixed or absolute. The WTRU may also monitor non-service cells.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. When referred to hereafter, the terminology "MAC-e PDU" includes but is not limited to a MAC-e PDU, a MAC-i PDU, or any other type of MAC-level PDU that is passed on to the physical layer.

Figure 2:
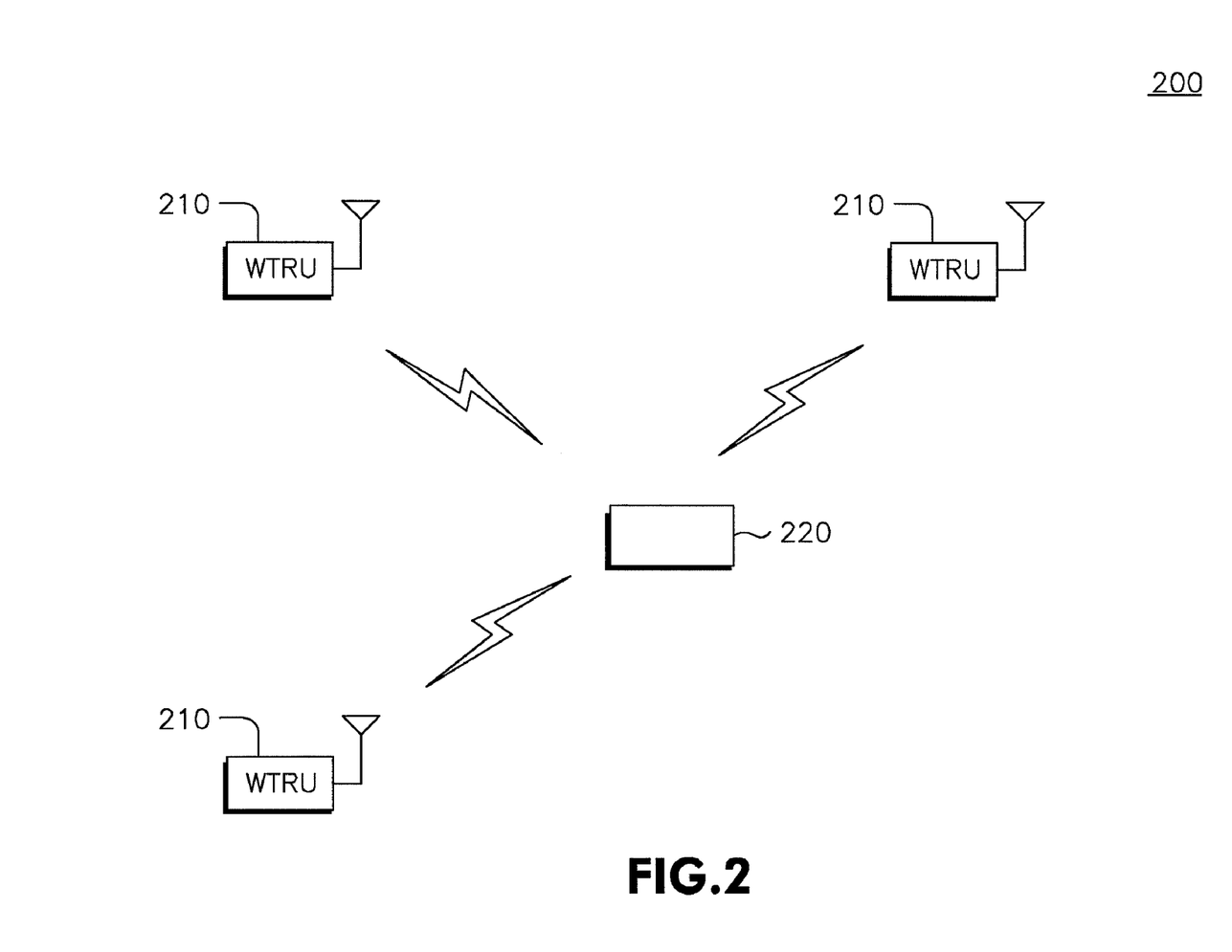
FIG. 2 shows an example wireless communication system including a plurality of wireless transmit/receive units (WTRUs) and a base station.

An evolved random access channel (E-RACH) may use a subset of the functionality offered by an evolved dedicated channel (E-DCH). FIG. 2 shows a wireless communication system 200 including a plurality of WTRUs 210 and a base station 220. As shown in FIG. 2, the WTRUs 210 are in communication with the base station 220. Although three (3) WTRUs 210 and one (1) base station 220 are shown in FIG. 2, it should be noted that any combination of wireless and wired devices may be included in the wireless communication system 200. Each WTRU 210 may communicate with the station 220 over an E-RACH.

Figure 3:
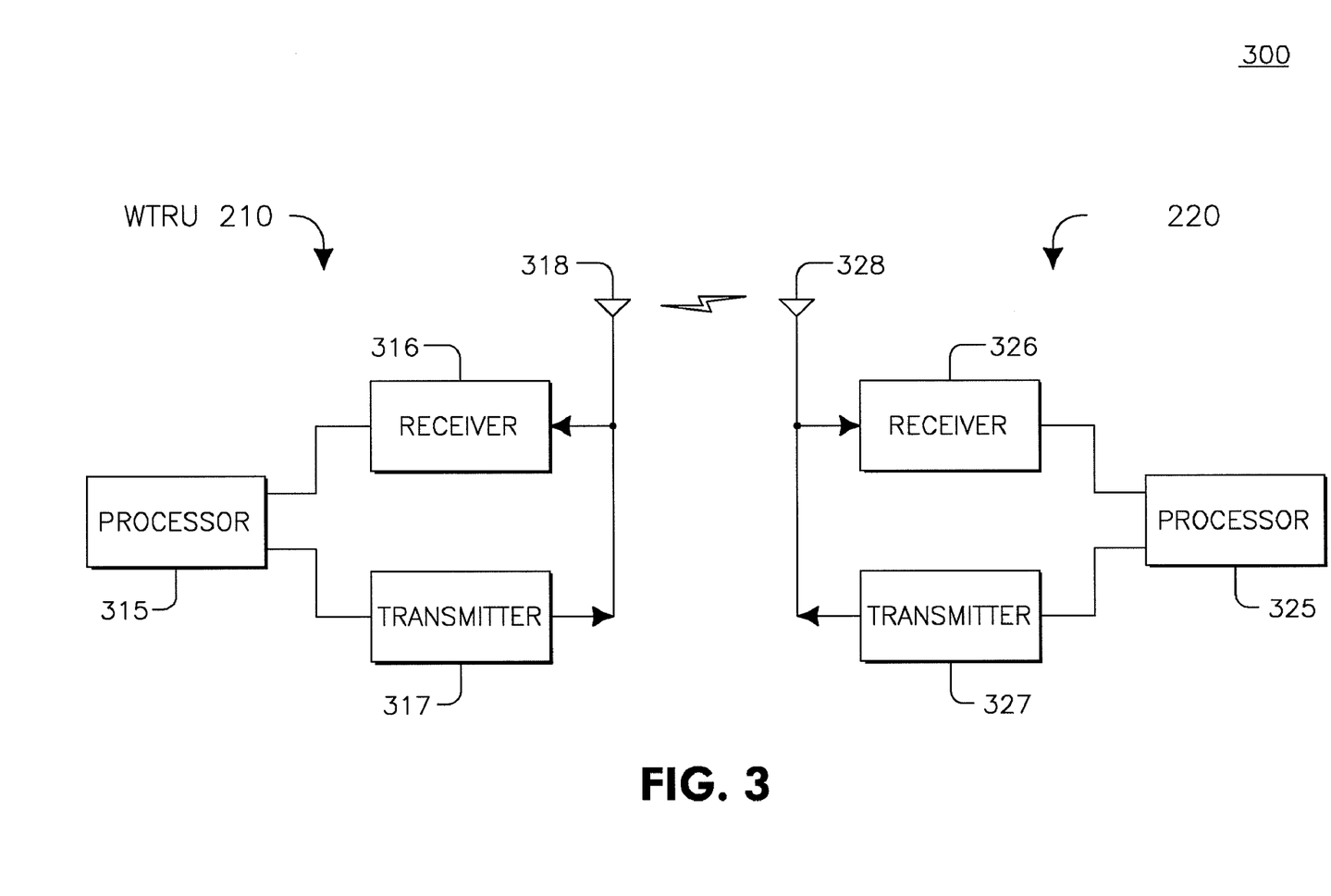
FIG. 3 is a functional block diagram of a WTRU and the base station of FIG. 2.

FIG. 3 is a functional block diagram 300 of a WTRU 210 and the base station 220 of the wireless communication system 200 of FIG. 2. As shown in FIG. 2, the WTRU 210 is in communication with the base station 220. Both are configured to communicate over an enhanced random access channel (E-RACH).

In addition to the components that may be found in a typical WTRU, the WTRU 210 includes a processor 315, a receiver 316, a transmitter 317, and an antenna 318. The processor 315 is configured to perform all processing required for the WTRU 210 to communicate over an E-RACH. The receiver 316 is configured to receive signals from the Node B and the transmitter 317 is configured to transmit signals over the E-RACH. The receiver 316 and the transmitter 317 are in communication with the processor 315. The antenna 318 is in communication with both the receiver 316 and the transmitter 317 to facilitate the transmission and reception of wireless data.

In addition to the components that may be found in a typical base station, the base station 220 includes a processor 325, a receiver 326, a transmitter 327, and an antenna 328. The receiver 326 is configured to receive signals over the E-RACH and the transmitter 327 is configured to transmit signals to the WTRU. The receiver 326 and the transmitter 327 are in communication with the processor 325. The antenna 328 is in communication with both the receiver 326 and the transmitter 327 to facilitate the transmission and reception of wireless data.

HARQ retransmission and associated signaling may be efficiently implemented on the E-RACH. A number of HARQ retransmissions may be fixed by the network to a value of maximum retransmissions, MAX_RTX, where MAX_RTX is an integer value. The value can be signaled on the broadcast channel, signaled by radio resource control (RRC) messaging to the WTRU upon configuration, or pre-defined.

Each MAC-e PDU resulting transport block is transmitted MAX_RTX successive number of times. Optionally, an ACK/NACK can be transmitted by the network on the corresponding E-HICH at the end of the MAX_RTX transmissions to indicate a successful transmission of the MAC-e PDU.

Figure 4:
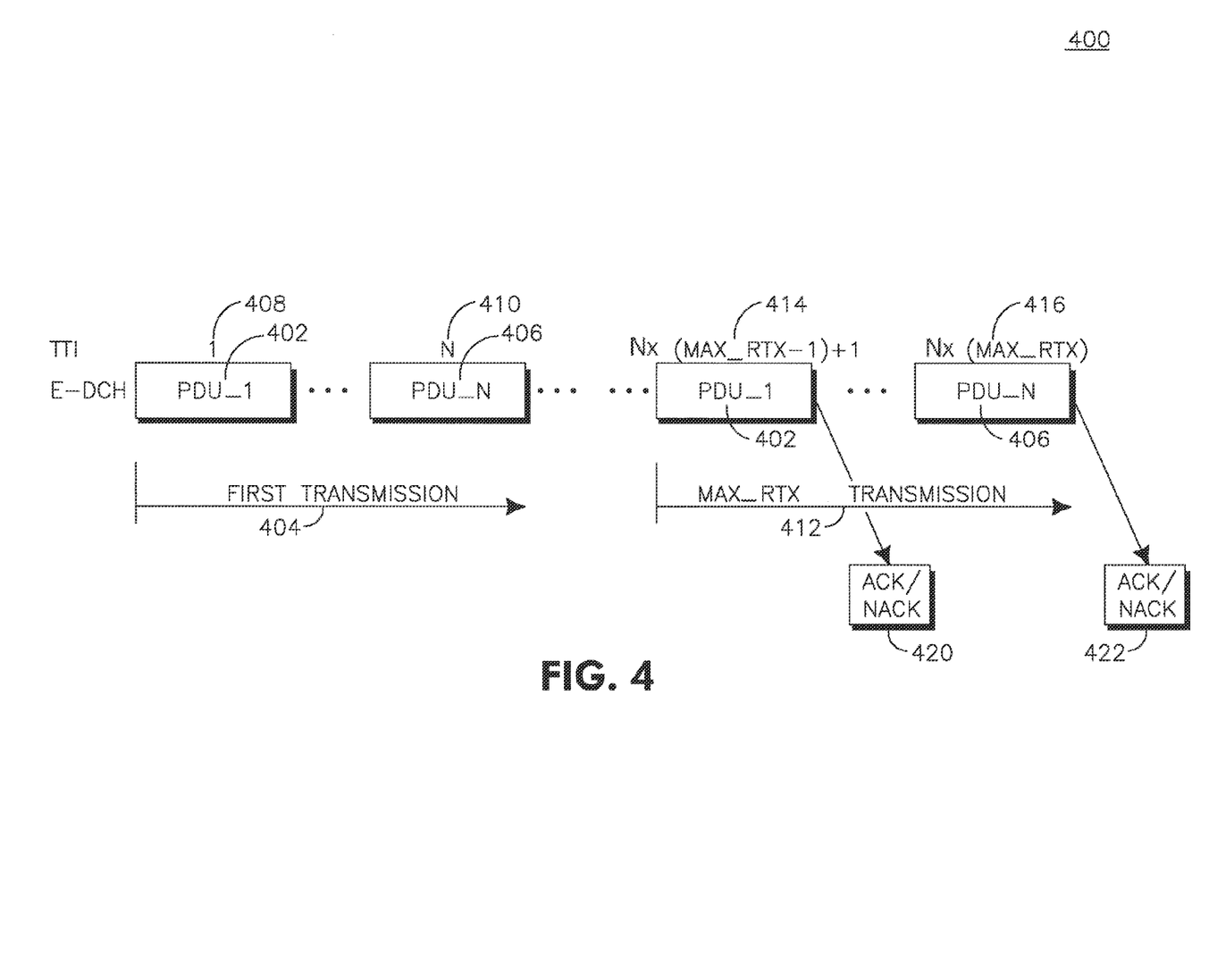
FIG. 4 shows transmission of a MAC-e PDU in accordance with one embodiment.

Multiple (N) MAC-e PDUs may be time-multiplexed to take advantage of time diversity. FIG. 4 shows transmission of a MAC-e PDU 400 in accordance with one embodiment. In a first transmission 404, a WTRU may transmit the multiplexed MAC-e PDUs (402, 406). The first transmission 404 may include MAC-e PDU_1 (402) transmitted in a first TTI 408 and MAC-e PDU_N 406 transmitted in an Nth TTI 410. The WTRU should have knowledge of how may PDUs are to be transmitted. MAC-e PDU_1 (402) through MAC-e PDU_N (406) are transmitted in TTI_1 408 through TTI_N 410 respectively and are transmitted as a block MAX_RTX times. The (MAX_RTX)–1 transmission 412 includes MAC-e PDU_1 (402) retransmitted in TTI_N×(MAX_RTX–1)+1 (414) and PDU_N 406 retransmitted in TTI_N× MAX_RTX 416. The Node-B transmits the first corresponding ACKlNNACK 420 after TTI_N×(MAC_RTX–1)+1 (414) and the Nth corresponding ACKlNNACK 422 after TTI_N×(MAX_RTX) 416.

This approach may be used when the number of MAC-e PDUs to transmit is known by the WTRU prior initiating the E-RACH message part. The number of MAC-e PDUs to transmit may be explicitly indicated to the UMTS terrestrial radio access network (UTRN) by adding or replacing fields in the E-DPCCH. Alternatively, a Node B may decode the information blindly from the MAC-e headers and other information.

Figure 5:
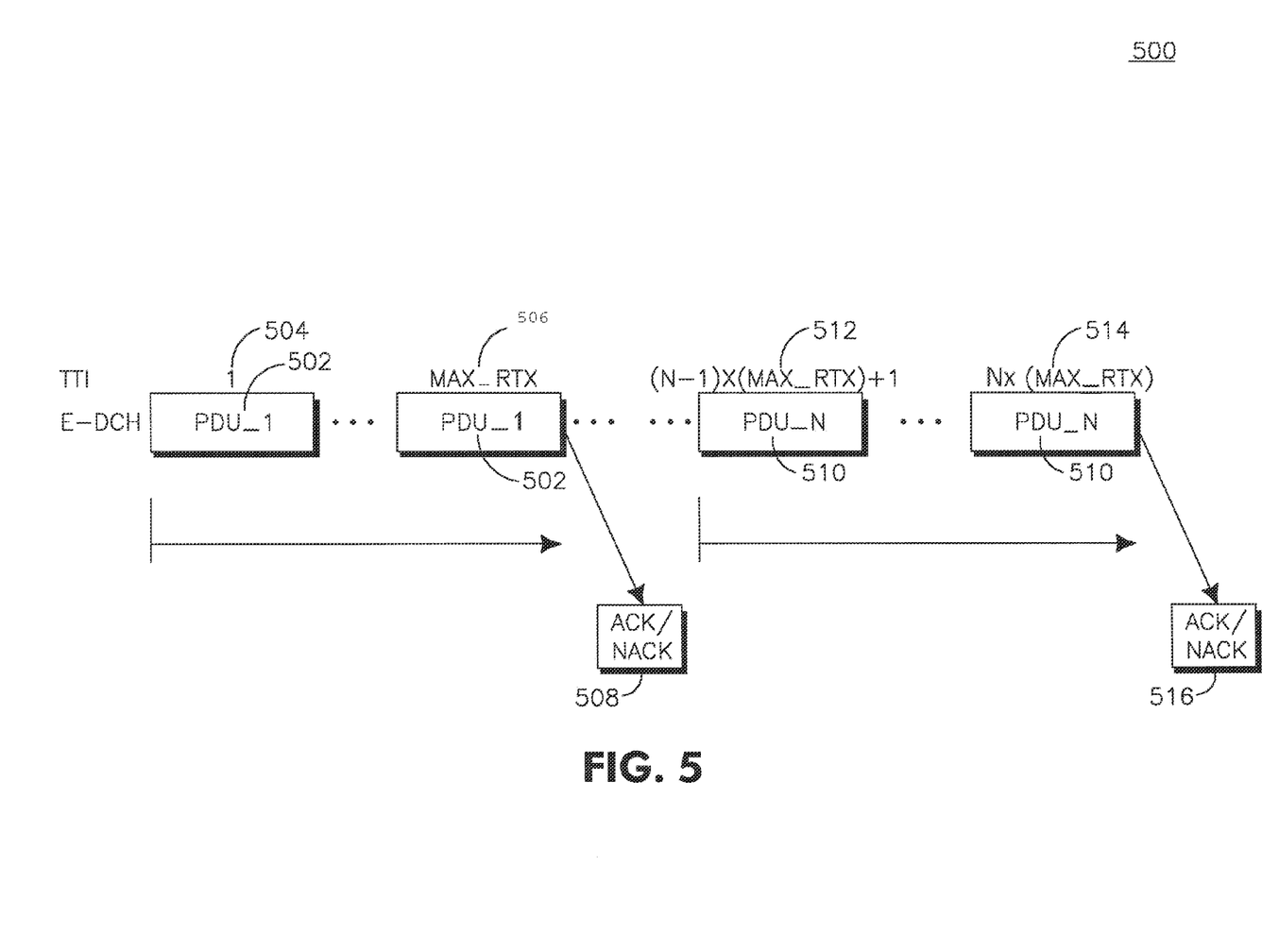
FIG. 5 shows transmission of a MAC-e PDU in accordance with an alternative embodiment

The MAC-e PDUs may be transmitted successively. FIG. 5 shows transmission of a MAC-e PDU 500 in accordance with an alternative embodiment. MAC-e PDU_1 502 is transmitted in TTI_1 (504) through TTI_MAX_RTX 506. An ACK/NACK 508 is transmitted from the Node-B after TTI_MAX_RTX 506 in response to the WTRU transmission. Similarly, MAC-e PDU_N 510 is transmitted in TTI_(N−1)× MAX_RTX+1 512 through TTI_N×MAC_RTX 514. A second ACK/NACK 516 is transmitted after TTI_N×MAC_RTX 514. This approach may be used when the number of MAC-e PDUs to transmit is unknown to the WTRU when it starts transmission of the E-RACH message part.

An ACK/NACK can be transmitted on the downlink after the Node B has received all HARQ retransmissions belonging to the respective MAC-e PDU. This may require resources for the E-HICH or a different, possibly shared, channel designed for this purpose may also be used while reducing the overall latency. The WTRU can determine whether to retransmit the unsuccessful transport blocks in the same E-RACH message part transmission, or in a subsequent RACH access.

The transmission procedure used by the WTRU when multiple MAC-e PDUs are present can be pre-configured, signaled by higher layers, such as on the broadcast channel or using an RRC configuration message, for example, or can be signaled using location update messages, such as layer 1 (L1) or layer 2 (L2) messages, for example. Alternatively, the transmission procedure can be inferred from the transmission sequence number in the MAC header or from another new or existing information field. The transmission procedure can be determined by the WTRU in real time.

When using the E-RACH, the Node B knows when WTRUs will start transmitting data because of the preamble phase and the acknowledgment on the Acquisition Indicator Channel (AICH). Therefore, incremental redundancy can be used on the E-RACH, even if the number of retransmissions is fixed. The redundancy version parameters can be configured by the Node B for all retransmissions. This information can be signaled on the broadcast channel or to each WTRU upon configuration by RRC messages, or preconfigured.

The bit fields reserved for the redundancy version in the E-DPCCH can be removed completely, thus allowing a reduction of E-DPCCH power overhead. Alternatively, the bit fields can be allocated to a different functionality. Alternatively, the E-RACH phase can be configured to use chase combining. The redundancy version information fields could also be removed from the E-DPCCH header.

HARQ processes may be time multiplexed among WTRUs sharing the same scrambling code, which may improve code usage. Since the WTRUs may not have a tight synchronization, there may be guard intervals specified to ensure that the Node B receives signals only from one WTRU at a time on the same channel. The guard interval may be a complete TTI. The WTRUs are synchronized to a common downlink channel reference as open loop synchronization is sufficient since the propagation delays are much smaller than the guard intervals.

Figure 6:
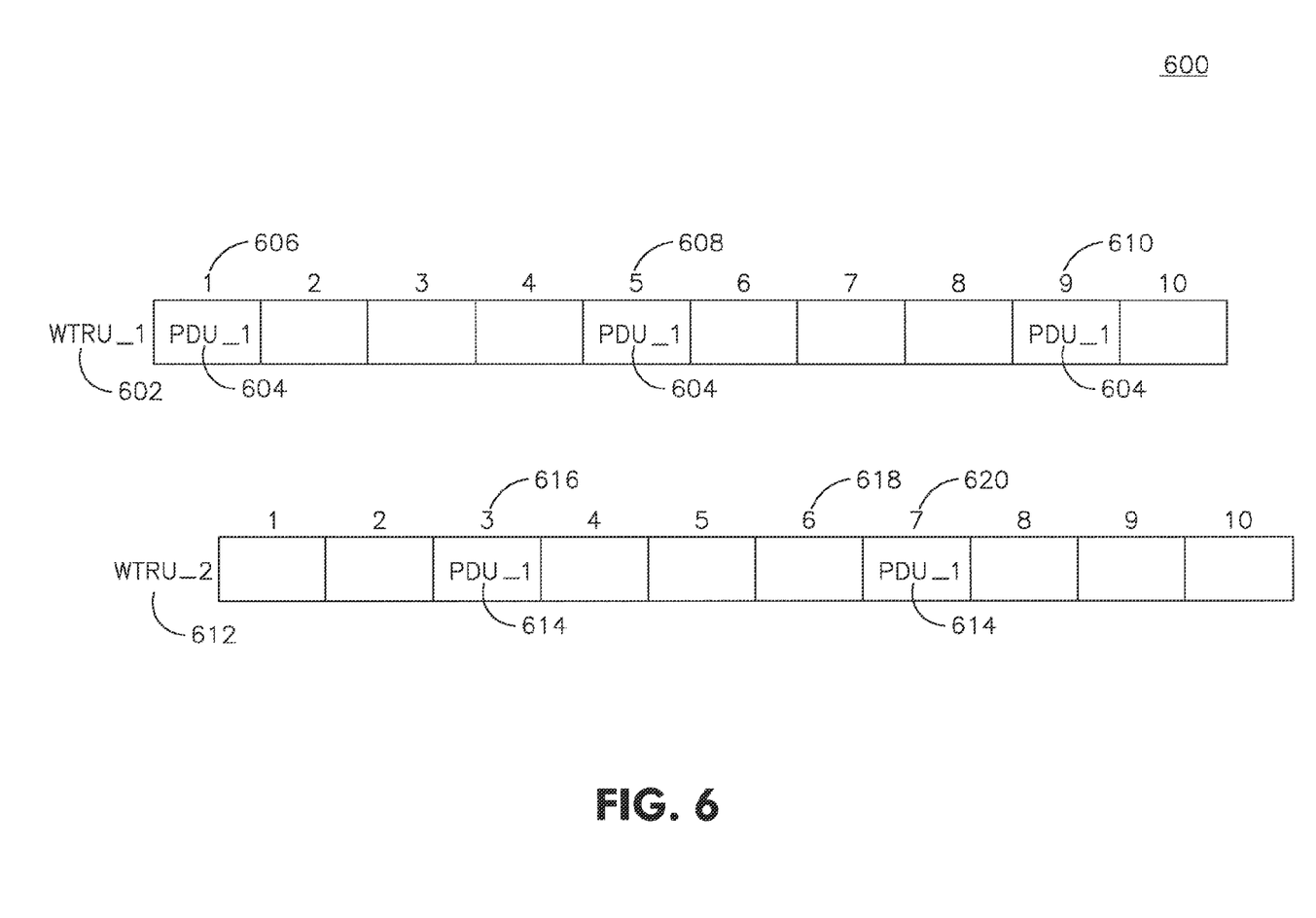
FIG. 6 shows 10 ms TTI HARQ time multiplexing in accordance with one embodiment.

Time multiplexing WTRUs can be achieved in 10 ms TTIs and 2 ms TTIs. For 10 ms TTI, two (2) WTRUs transmitting in a single HARQ process can share the E-RACH channel. FIG. 6 shows 10 ms TTI HARQ time multiplexing 600 in accordance with one embodiment. WTRU_1 602 transmits PDU_1 604 in TTI_1 606. PDU_1 604 is retransmitted in TTI_5 608 and TTI_9 610. PDU_1 604 may only be transmitted on every fourth ($4^{th}$) TTI.

In WTRU_2 612, PDU_1 614 is transmitted in TTI_3 616. This leaves a 10 ms guard TTI 618 between the transmissions of WTRU_1 602 and WTRU_2 612. PDU_1 614 is also retransmitted every four (4) TTIs. The first retransmission of PDU_1 614 from WTRU_2 612 is TTI_7 620.

Figure 7:
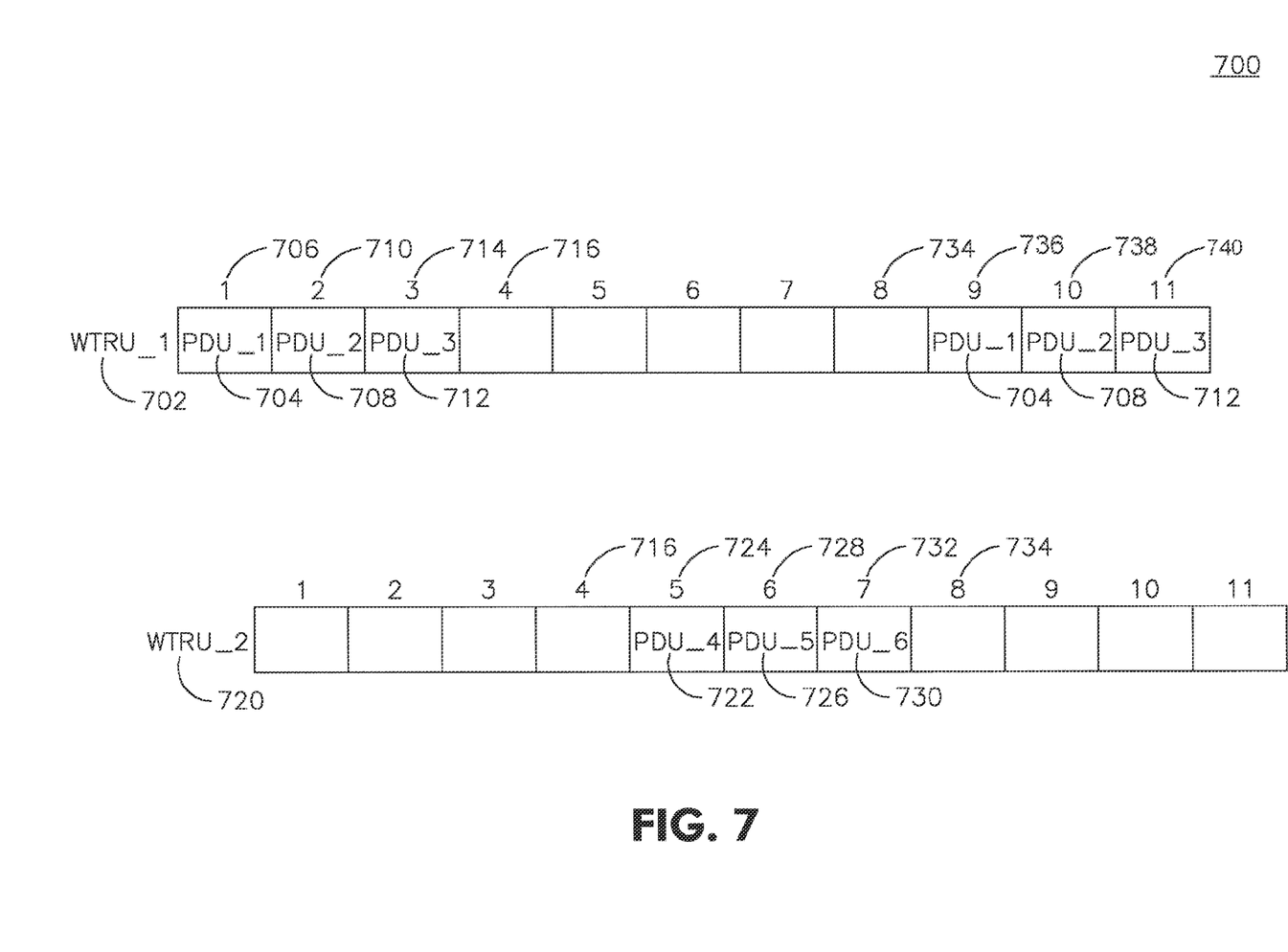
FIG. 7 shows 2 ms TTI HARQ time multiplexing in accordance with one embodiment.

FIG. 7 shows 2 ms TTI HARQ time multiplexing 700 in accordance with one embodiment. Each WTRU can transmit up to three MAC-e PDUs per set of 8 HARQ processes. As shown in FIG. 7, WTRU_1 702 transmits PDU_1 (704) in TTI_1 (706), PDU_2 (708) in TTI_2 (710) and PDU_3 (712) in TTI_3 (714). TTI_4 (716) is a 2 ms buffer TTI, after which WTRU_2 (720) transmits PDU_4 (722) in TTI_5 (724), PDU_5 (726) in TTI_6 (728) and PDU_6 (730) in TTI_7 (732). TTI_8 (734) is a second 2 ms buffer TTI, after which WTRU_1 (702) retransmits PDU_1 (704) in TTI_9 (736), PDU_2 (706) in TTI_10 (738) and PDU_3 (708) in TTI_11 (740).

Figure 8:
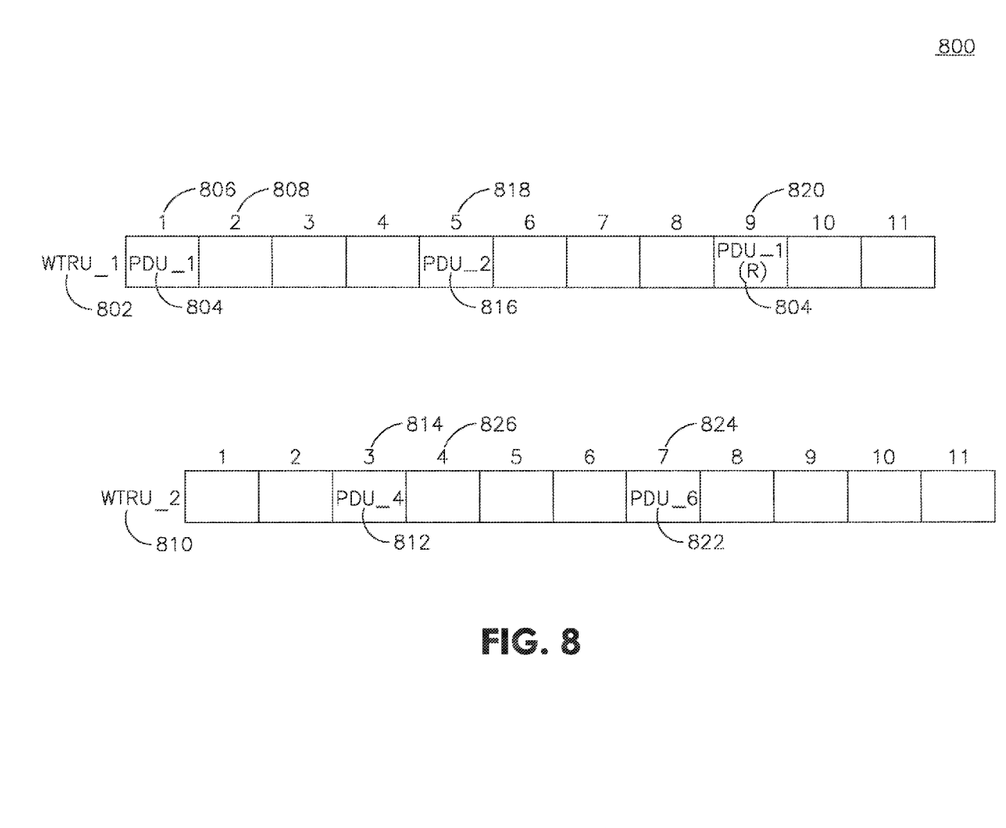
FIG. 8 shows 2 ms TTI HARQ time multiplexing in accordance with an alternative embodiment.

FIG. 8 shows 2 ms TTI HARQ time multiplexing 800 in accordance with an alternative embodiment. Two (2) MAC-e PDUs per set of 8 HARQ processes can be transmitted per WTRU. Single PDU transmissions between two guard periods allows up to 4 WTRUs to share the same E-RACH channel. As shown in FIG. 8, WTRU_1 (802) transmits PDU_1 (804) in TTI_1 (806). TTI_2 (808) is a 2 ms guard TTI. WTRU_2 (810) transmits PDU_3 (812) in TTI_3 (814). TTI_4 (826) is a 2 ms guard TTI. PDU_2 (816) is transmitted by WTRU_1 (802) in TTI_5 (818). PDU_6 (822) is transmitted by WTRU_2 (810) in TTI_7 (824) and PDU_1 (804) is retransmitted in TTI_9 (820), each after a 2 ms buffer TTI.

The time-multiplexing information and sub-HARQ process allocation may be indicated to the WTRU via signaling. The time-multiplexing may be unique to each cell and may be broadcast, predefined for the entire system, or determined on a WTRU basis and signaled using L1 L2 or layer 3 (L3) messaging prior to the E-RACH message part. The sub-HARQ process allocation can be based on the access slot timing, for example.

A grant may be used to indicate to a WTRU the maximum amount of uplink (UL) radio resources the WTRU may use. Grants may be sent as fast as once per TTI. Absolute grants provide an absolute limitation on the maximum amount of uplink (UL) resources a WTRU may use. Relative grants increase or decrease the resource limitation as compared to the previous level.

Prior to the E-RACH message part there is no UL DPCCH, therefore the initial grant can be interpreted as a power ratio over the power of the last preamble sequence transmitted on the E-RACH and that was acknowledged on the AICH. The interpretation of the grant can change once the DPCCH power control loop is started, or after it is considered stable enough.

The value of the initial grant can be cell-specific, or E-PRACH-specific. In the context of E-DCH in CELL_FACH state and Idle mode, the terminology "E-PRACH" refers to shared E-DCH resources. In either case, it can be signaled on the broadcast channel or upon configuration of the WTRU via RRC message, or even pre-defined.

If a fixed grant is used, there may be no absolute or relative grants transmitted during the E-RACH message part. The WTRU keeps its initial grant for the entire duration of the E-RACH message part transmission. This may result in savings on the number of downlink control channels. For example, an absolute grant channel (E-AGCH) and relative grant channels (E-RGCH) may not be required.

If an absolute grant on AICH is used, an absolute grant for each Physical Random Access Channel (E-PRACH) is transmitted during a non-active period following the AICH. Since the AICH is dedicated to a single E-PRACH, the absolute grant does not need to include the target WTRU identity. The grant may be simplified to contain a relatively small number of information bits. This may reduce or eliminate the need for the E-RGCH and E-AGCH.

When using a fixed number of HARQ retransmission, as described above, the E-HICH may not be needed. Similarly, depending on the grant mechanism as outlined above, the E-AGCH and E-RGCH could be eliminated, reducing further the number of control channels and the associated overhead.

In the case where the E-AGCH is eliminated, the WTRU identity (e.g.: E-RNTI) would no longer be required for downlink control signaling.

A WTRU may not have an active set when it is in CELL_FACH state. Thus the WTRU may monitor only the control channels of the cell it is attached to. To allow non-serving relative grants, the WTRUs would be moved to CELL_DCH state and told which Node Bs are part of its active set.

However, restricting the cells which a WTRU may monitor may not be required, thus allowing the use of non-serving relative grants. The WTRU may be configured to monitor a number of non-serving E-RGCHs. The set of non-serving E-RGCHs to monitor can be cell-specific. The set of E-RGCH scrambling codes, channelization codes and signatures can be signaled on the broadcast channel, or signaled via RRC messages upon configuration.

In order to reduce the amount of resources required by the E-RACH in CELL_FACH and the associated overhead, the number and usage of control channels may be reduced. This may result in a reduction of the amount of signaling for the E-RACH configuration as the resource information related to those channels may no longer be required.

If the E-DCH resources are shared, the duration of the E-RACH transmission phase may be limited. Due to the limitation, a Node B may not have all the time required to adapt the grant with the E-RGCH to satisfy the WTRU via a happy bit mechanism. Therefore, the happy bit may not be sent on the E-DPCCH.

If the value of the happy bit would have indicated that the WTRU requires a new grant, then the scheduling information (SI) may be transmitted on the first E-RACH transmission to inform the Node B of the transmission buffer status.

Alternatively, the SI may be transmitted on a first transmission, regardless of the value that the happy bit would have taken. If new data arrives in the transmission buffer, the WTRU can be configured to send a new SI to the Node B and wait for the response on the E-AGCH to determine if the new data can be transmitted as part of the current E-RACH message part. If the new grant does not allow the data to be transmitted as part of the current E-RACH message part, then its transmission may be delayed until the next transmission opportunity, which may be from a new E-RACH access or from changing to CELL_DCH state, for example.

Alternatively, the WTRU can be configured to not send a new SI and delay the transmission until the next opportunity, which may be from a new E-RACH access or from changing to CELL_DCH state, for example. The configuration can be cell-specific and transmitted to WTRUs via the broadcast channel, or using RRC signaling at the WTRU configuration, or pre-configured.

In accordance with yet another embodiment, the WTRU may be forced to start a new E-RACH transmission if the information to be transmitted does not fit in the allowed transport block. This may eliminate the need for the transmission of any uplink scheduling information, either SI or happy bit.

The overhead associated with the transmission of the E-DPCCH may be removed. Some of the bits associated with the E-DPCCH, such as the happy bit and the redundancy version bits can be removed from the E-DPCCH. By further removing the E-TFCI bits, the E-DPCCH no longer needs to be transmitted, leading to a possible significant saving in power.

To remove the Transport Format Combination Indicator (E-TFCI) bits, blind transport format combination detection at the Node B may be implemented. To simplify the operation, the possible transport format channels (E-TFC) can be limited to a given subset, which can be signaled via the broadcast channel or using radio resource connection (RRC) messaging.

For short transmission period, the F-DPCH and uplink TPC commands on the DPCCH may not be required and could be altogether eliminated. The WTRU transmission power may be adjusted relative to the power of the last signature preamble transmitted during the RACH preamble part.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method to indicate an initial serving grant to a wireless transmit receive unit (WTRU), the method comprising: the WTRU receiving an initial serving grant over a broadcast channel, wherein the initial serving grant is cell specific for an E-DCH resource.

2. The method of claim 1, wherein the initial serving grant is a fixed grant.

3. The method of claim 2, wherein no absolute grants or relative grants are transmitted during an E-RACH message part.

4. The method of claim 3, wherein the WTRU keeps the initial serving grant during the E-RACH message part.

5. The method of claim 1, further comprising the WTRU receiving an absolute grant during a non-active period following an acknowledge signal on an acquisition indicator channel (AICH).

6. The method of claim 1, further comprising the WTRU monitoring a non-serving relative grant channel.

7. A wireless transmit receive unit (WTRU) comprising:
a receiver configured to receive an initial serving grant over a broadcast channel, wherein the initial serving grant is cell specific for an E-DCH resource.

8. The WTRU of claim 7, wherein the initial serving grant is a fixed grant.

9. The WTRU of claim 8, wherein no absolute grants or relative grants are transmitted during an E-RACH message part.

10. The WTRU of claim 9, wherein the WTRU keeps the initial serving grant during the E-RACH message part.

11. The WTRU of claim 7, wherein the receiver is further configured to receive an absolute grant during a non-active period following an acknowledge signal on an acquisition indicator channel (AICH).

12. The WTRU of claim 7, further comprising a processor configured to monitor a non-serving relative grant channel.

* * * * *